United States Patent
Gold et al.

(10) Patent No.: US 6,782,979 B1
(45) Date of Patent: Aug. 31, 2004

(54) SHOCK-ABSORBING ELEMENT FOR A MOTOR VEHICLE

(75) Inventors: Henning Gold, Wohneitz (DE); Stefan Beetz, Wohnsitz (DE); Peter Kobs, Wohnsitz (DE); Stephan Goebel, Wohnsitz (DE); Patrik Braun, Wohnsitz (DE)

(73) Assignee: PNP Luftfeder systeme GmbH, Crivitz (DE)

( * ) Notice: Subject to any disclaimer, the term of this patent is extended or adjusted under 35 U.S.C. 154(b) by 0 days.

(21) Appl. No.: 10/031,315

(22) PCT Filed: Jul. 14, 2000

(86) PCT No.: PCT/DE00/02280

§ 371 (c)(1),
(2), (4) Date: May 15, 2002

(87) PCT Pub. No.: WO01/05609

PCT Pub. Date: Jan. 25, 2001

(30) Foreign Application Priority Data

Jul. 16, 1999 (DE) .......................................... 199 32 717

(51) Int. Cl.⁷ .................................................. F16F 9/34
(52) U.S. Cl. ..................... 188/282.1; 188/280; 188/317; 188/322.15
(58) Field of Search ................................. 188/280, 281, 188/282.1–282.6, 322.15, 317; 267/124

(56) References Cited

U.S. PATENT DOCUMENTS

| | | | | |
|---|---|---|---|---|
| 2,316,924 A | * | 4/1943 | Whisler ....................... | 188/317 |
| 2,748,898 A | * | 6/1956 | Bourcier ...................... | 188/317 |
| 4,004,662 A | * | 1/1977 | Sorgatz et al. ............... | 188/284 |
| 4,624,347 A | * | 11/1986 | Mourray ................. | 188/322.15 |
| 4,844,428 A | | 7/1989 | Margolis et al. | |
| 4,895,229 A | * | 1/1990 | Kato ........................ | 188/282.6 |
| 5,072,812 A | * | 12/1991 | Imaizumi .................. | 188/282.5 |
| 5,133,434 A | * | 7/1992 | Kikushima et al. ...... | 188/282.1 |
| 5,332,069 A | * | 7/1994 | Murakami .................. | 188/282 |
| 6,352,145 B1 | * | 3/2002 | DeMolina et al. .......... | 188/281 |

FOREIGN PATENT DOCUMENTS

| | | |
|---|---|---|
| DE | 8413300 | 9/1984 |
| DE | 3641623 | 6/1987 |
| DE | 3716819 | 12/1987 |
| DE | 3810011 | 12/1988 |
| DE | 3722152 | 1/1989 |
| DE | 3824932 | 1/1990 |
| DE | 4334007 | 4/1995 |
| DE | 4418120 | 11/1995 |
| EP | 0160277 | 11/1985 |
| EP | 0257779 | 3/1988 |
| EP | 0671572 | 9/1995 |
| FR | 2705127 | 11/1994 |

* cited by examiner

Primary Examiner—Jack Lavinder
Assistant Examiner—Benjamin A. Pezzlo
(74) Attorney, Agent, or Firm—Horst M. Kasper

(57) ABSTRACT

Known shock-absorbing elements are provided with overflow throttles equipped with sealing disks. These overflow throttles have different opening characteristics for the two directions which cannot be changed. The aim of the invention is therefore to provide a novel overflow throttle that can be freely selected and changed. To this end, the overflow throttle consists of a first (13) and a second overflow throttle (13) that are spatially separate and that are allocated to respective pressure chambers (10, 11). Both overflow throttles are provided with sealing disks (23) and are oriented opposite to the sense of the direction of flow. Every overflow throttle (13) is linked with the other pressure chamber (10, 11) via at least one through bore (35) that evades the opposite overflow throttle (13).

28 Claims, 5 Drawing Sheets

SHOCK-ABSORBING ELEMENT FOR A MOTOR VEHICLE

Figure 1:
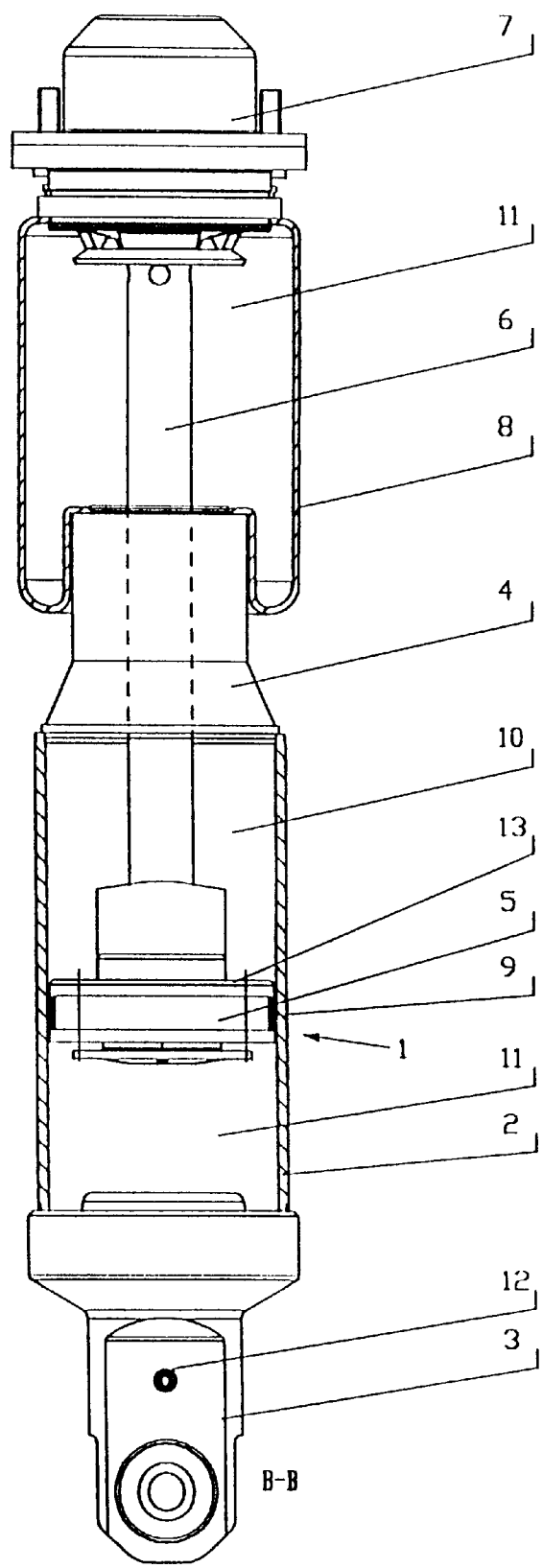

The Invention relates to a spring and damper unit according to the preamble of claim 1.

Spring and damper units of this kind are predominantly employed in the motor vehicle technology.

Spring and damper units are known particular through the German printed patent documents DE 3641623, DE 3824932, DE 4334007 and DE 8413300 U1.

In principle such a shock absorbing element comprises a cylindrical casing with the cover and the double acting piston fitted into the casing and having a one-sided piston rod penetrating the cover. The casing on the one hand and the piston rod on the other hand are solidly connected with a body part or, respectively, with the wheel suspension, wherein the free lying part of the piston rod is covered by bellows. For this purpose, the bellows are on the one hand attached to the cover of the casing and on the other hand attached to the head of the piston rod.

The piston subdivides the cylinder space of the casing into a pressure space being reduced during compression and into a pressure space being increased during compression, wherein the two cylinder spaces are connected to the outside through a casing connector to a source of compressed air and are connected to each other by one or several overflow throttles disposed in the piston.

For this purpose simple throttle bore holes are known from the German printed patent document DE 36 41 623, wherein the simple throttle bore holes have the same throttle effect relative to the balancing air stream in both directions of motion, whereby the piston motion is damped to the same extent in two directions. This is disadvantageous since a lesser damping motion is desired during compression relative to the rebound because of the required ground adhesion.

An overflow throttle meeting such a requirement is shown in the German printed patent document DE 84 13 300 U1, wherein the middle throttle bore whole on one side of the piston joins to a ring chamber on the other side of the piston and wherein the throttle bore hole is covered from the ring chamber by a flexible ring disk. This ring disk has on the one hand an outer stop and on the other hand an inner stop such that the ring disk lifts off from the respective stop in one flow passage direction at the outer edge and in the other flow passage direction at the inner edge. Different lever arms result from the different distance of the two stops relative to the middle of the ring disk, wherein the two different lever arms effect a different opening characteristic for the ring disk for the two passage flow directions. It is a disadvantage in connection with this usual kind of overflow throttles, that the ratio of the two opening characteristics with a onetime selected construction is a fixed value and thereby not any longer changeable and adaptable to various application situations.

Spring and damper units are further known from the U.S. Pat. No. 4,844,428, EP 0257779 A3, FR 2705127 A1 and EP 0671572 A1 which exhibit two oppositely directed overflow throttles in the piston for the two pressure spaces. In particular the printed patent document EP 0671572 A1 and the printed patent document FR 2705127 A1 show here overflow throttles, which comprise several uniformly distributed and by sealing disks in a direction closable passage bore holes.

These spring and damper units are complicated in construction and can therefore be produced only with large expenditures. In addition, each of the two flow throttles has a special constructive form, whereby different channel guides and dimensions result. This influences however the opening characteristic of the overflow throttles and thereby the damping behavior of the piston. Therefore these spring and damper units can only be employed for special cases of application.

Therefore it is an object of the present Invention to furnish a spring and damper unit of the recited kind wherein the opening characteristic of the overflow throttle is freely selectable and changeable for each passage flow direction.

This object is achieved by the characterizing features of claim 1. Advantageous embodiments of the Invention result from the features of claims 2 through 7.

The Invention eliminates the recited disadvantages of the state-of-the-art. The separate provision of the overflow throttle is a particular functional advantage. The flow resistance at each overflow throttle and thereby the damping characteristics for each direction of motion can be separately adjusted thereby by changing the sealing disk packets. A functional dependency of the two overflow throttles does not exist. The spring and damper unit is thereby relatively simple and thus cost favorable in construction and in production.

The Invention is to be the explained in more detail in the following by way of several embodiments.

Figure 2:
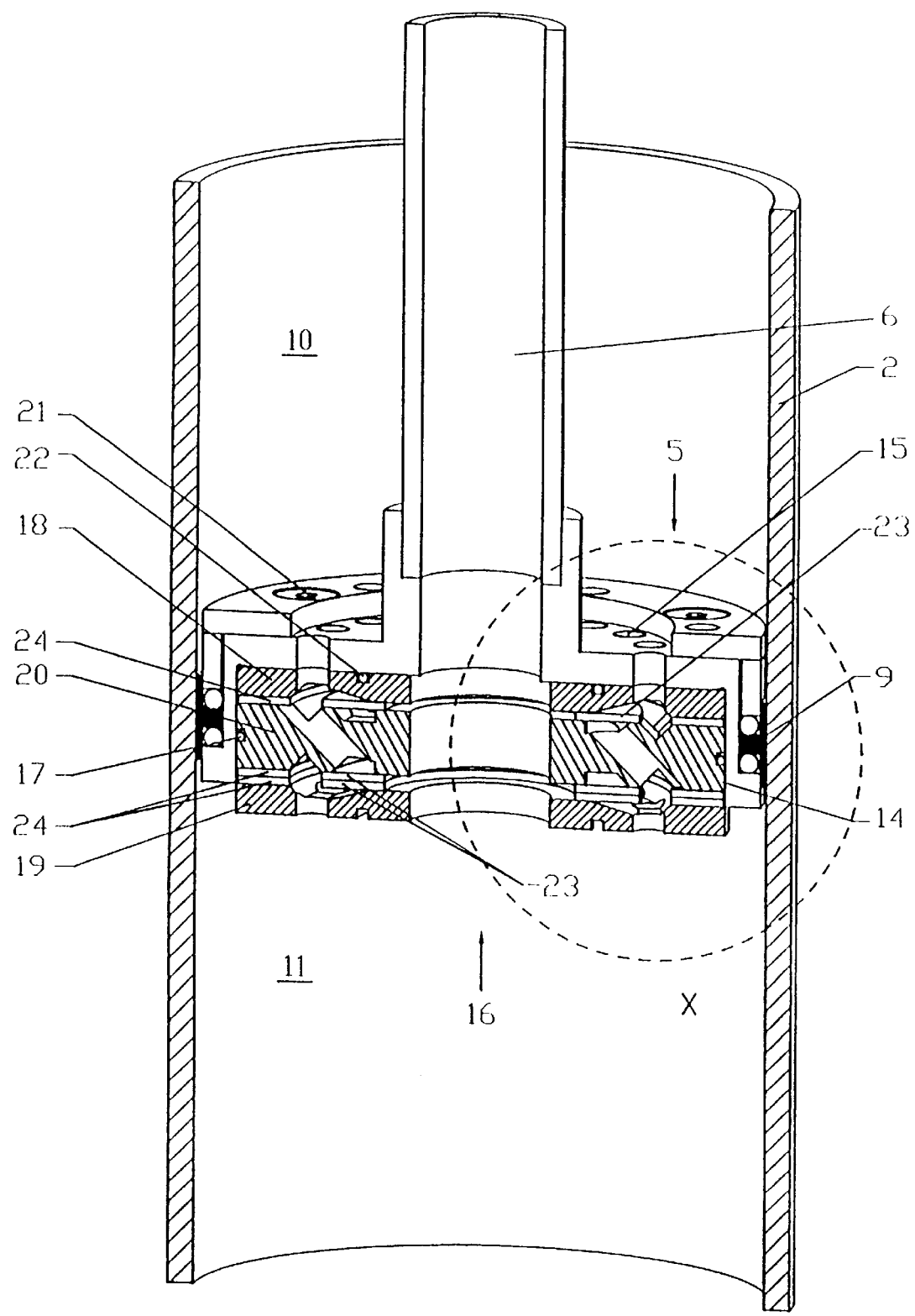
Figure 3:
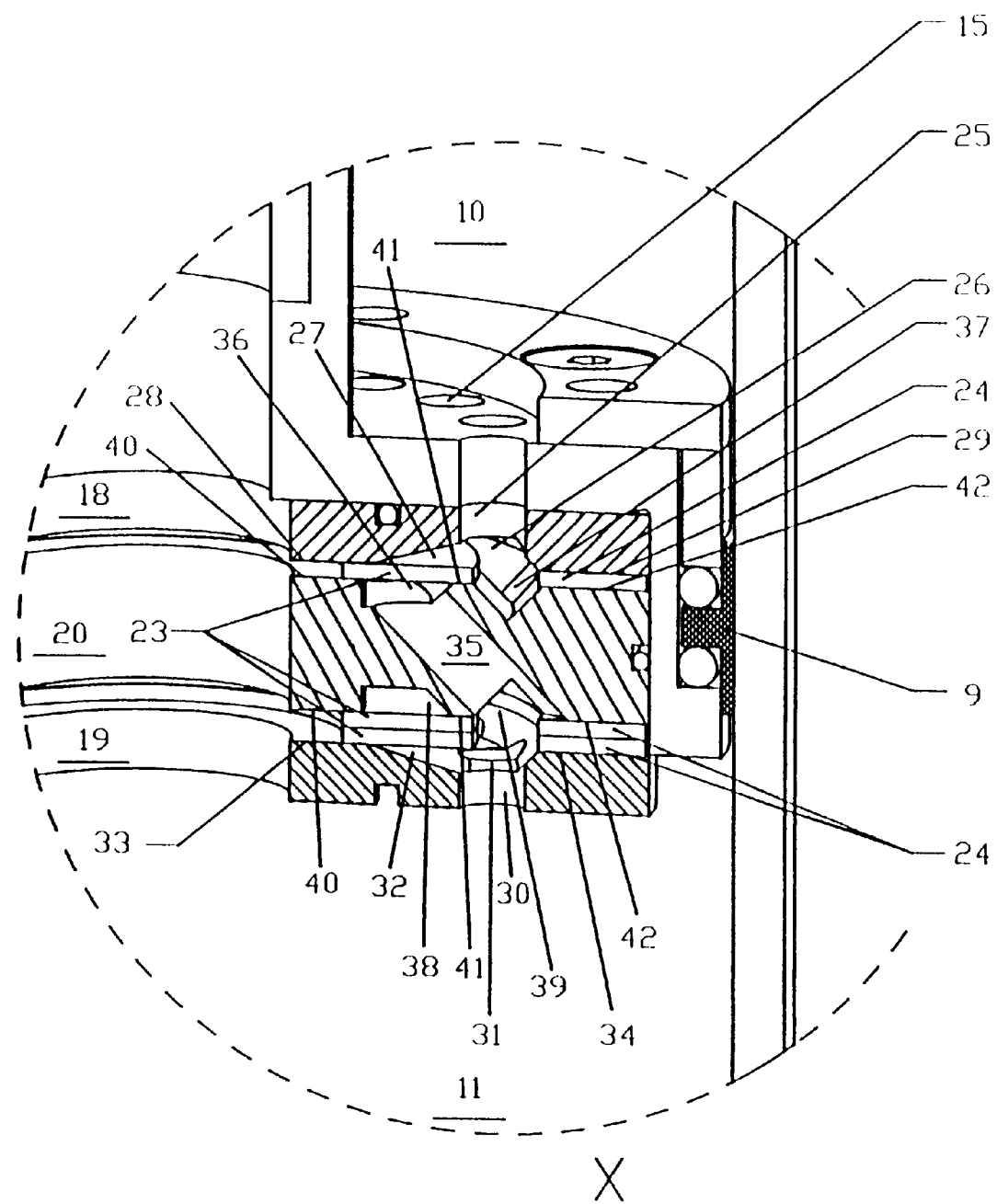
Figure 4:
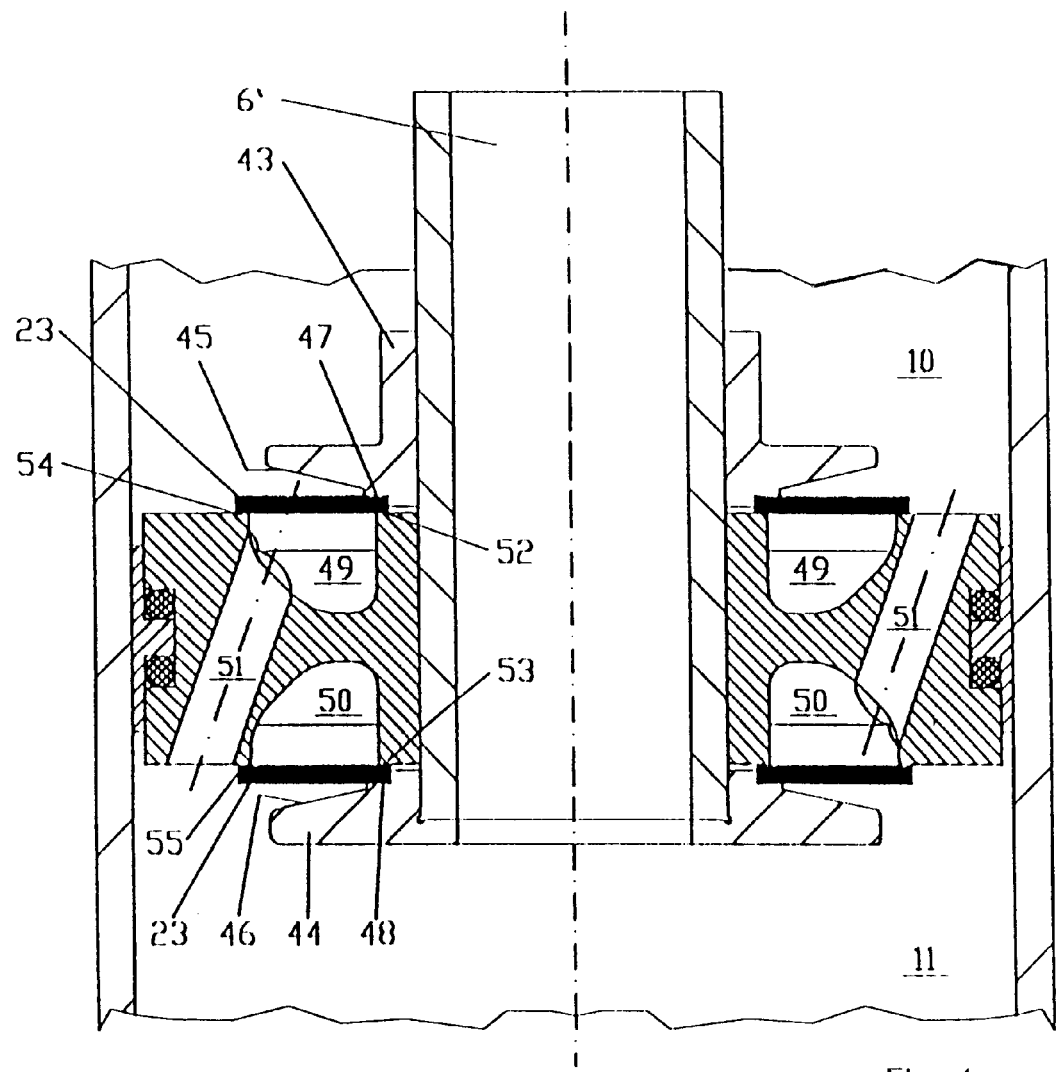
Figure 5:
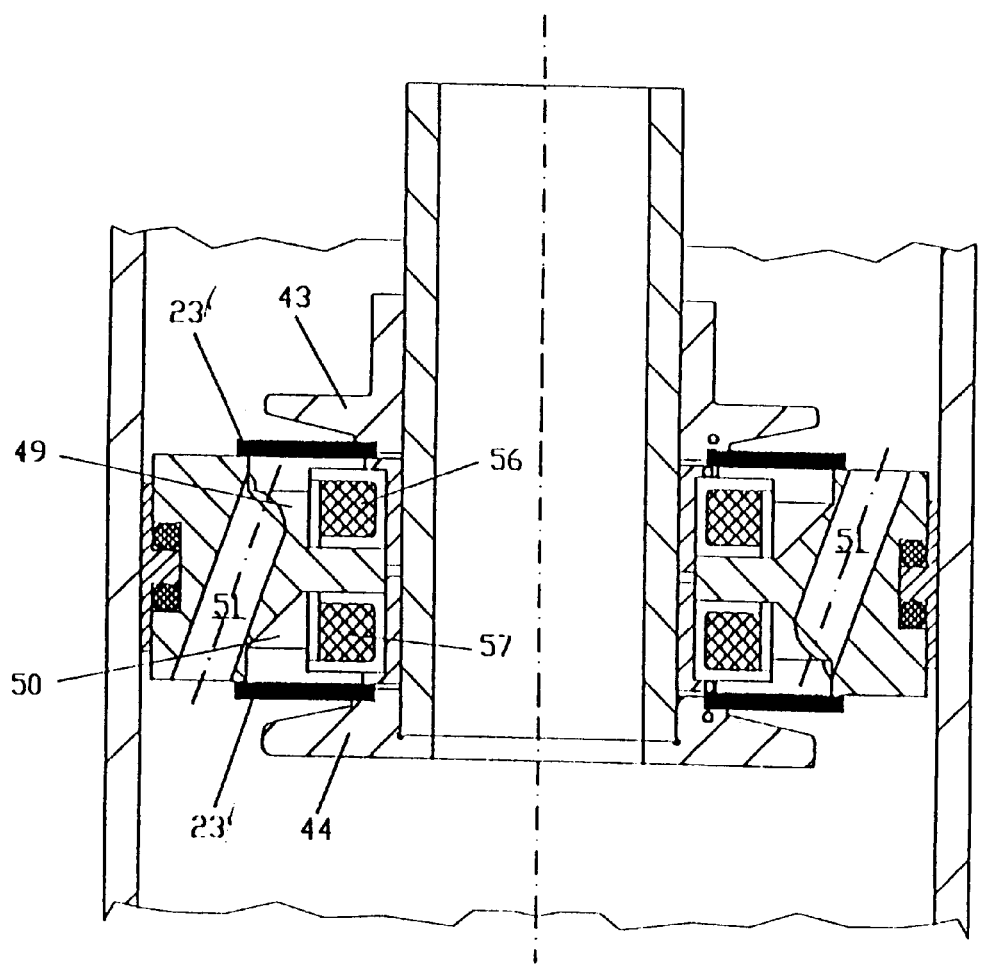

For this purpose there is shown in:

FIG. 1: a spring and damper unit in sectional view,

FIG. 2: the piston of the spring and damper unit in a first embodiment,

FIG. 3: a part section X of FIG. 2,

FIG. 4: the piston of the spring and damper unit in the second embodiment, and FIG. 5: the spring and damper unit with electromagnetic supported sealing disks.

According to FIG. 1 the spring and damper unit comprises a cylindrical casing 1 with a casing wall 2, a casing foot 3 for the mounting to a wheel suspension over motor vehicle and a casing cover 4 disposed opposite to the casing foot 3. A piston 5 is fitted into conventional way in the casing 1, wherein the piston 5 exhibits a piston rod 6 on one side. This piston rod 6 penetrates the casing cover 4 and is equipped at the free end of the piston rod 6 with a piston rod head 7, wherein the piston rod head 7 is furnished for stopping at the body of the motor vehicle. The part of the piston rod 6 protruding from the casing 5 penetrates a pressure chamber, wherein the pressure chamber is surrounded by the bellows 8 in the kind that the bellows 8 is attached at the casing cover 4 on the one hand and at the piston rod head 7 on the other hand. The piston 5 is furnished sealingly relative to the cylinder wall 2 with a piston ring 9 and thus divides the available inner space of the casing 1 into a first pressure space 10 and into a second pressure space 11. The second pressure space 11 is connected to the pressure chamber surrounded by the bellows 8 through a bore hole disposed in the piston rod 6. One of the two pressure spaces 10, 11 is connected to a source of compressed air through a compressed air connector 12, wherein the source of compressed air generates a desired pressure in the two pressure chambers 10, 11 and maintains the desired pressure at a constant value. The overflow throttle 13 is disposed in the piston 5, wherein the overflow throttle 13 connects the two pressure spaces 10 and 11 to each other and wherein a volume stream balancing of the enclosed compressed air is performed by a corresponding motion of the piston over the two pressure spaces 10 and 11.

Such an overflow throttle 13 according to a first form is constructed according to FIGS. 2 and 3 such that the piston 5 has a pot shaped form with a hollow space 14, which hollow space 14 is disposed with its open side toward the casing foot 3. The closed front face of the piston 5 disposed on the side of the piston rod is equipped with several axial flow through bore holes 15 uniformly distributed over a partial circle.

A throttle insert 16 is disposed in the hollow space 14 of the piston 5, wherein the throttle insert 16 carries a sealing element 17 at the jacket face of the throttle insert 16 and thereby seals the throttle insert 16 relative to the hollow space 14 of the piston. This throttle insert 16 is constructed of several parts and comprises a first cover piece 18 disposed inside in the hollow space 14, a second cover piece 19 disposed on the outside as well as an intermediately disposed middle piece 20, wherein the first cover piece 18, the middle piece 20, and the second cover piece 19 are screwed together and art jointly attached at the piston 5 with screws 21. The first cover piece 18 is equipped with a radially acting sealing element 22, which sealing element 22 closes the intermediate space between the throttle insert 16 and the closed front face of the piston 5. In each case one or several sealing disks 23 and spacer disks 24 are disposed between the first cover piece 18 and the middle piece 20 as well as between the middle piece 20 and the second cover piece 19 and are jointly tensioned and clamped with the throttle insert 16.

Several throttle channels are furnished in axially parallel extension in the throttle insert 16, wherein the throttle channels 15 connect or close the first pressure space 10 and the second pressure space 11 in connection and in cooperation with the axial flow through bore holes 15 and the sealing disks 23. Initially the first cover piece 18 is furnished with the several axial parallel aligned and uniformly distributed on a part circle disposed passage bore holes 25, which passage bore holes 25 are connected to passage bore holes 15 in the piston 5 continuously on the one hand through a not illustrated ring channel in the piston 5 or in the first cover piece 18. On the other hand the passage bore holes 25 of the first cover piece 18 join into a circulating ring groove 26, wherein the circulating ring groove 26 is furnished in cross-section toward the axis with the conical stop face 27 for the sealing disks 23. An internal web face 28 as well as an outer web face 29 are disposed at the two sides of the ring groove 26.

The second cover piece 19 is furnished just as in the cover piece 18 with formed and disposed passage bore holes 30, wherein the passage bore holes 30 join into an equally form ring groove 31 on the piston rod side with a conical stop face 32 for the sealing disks 23. An inner web face 33 and the outer web face 34 again result through the ring groove 31.

The middle piece 20 disposed between the two cover pieces 18 and 19 is equipped with further passage bore holes 35, wherein the passage bore holes 35 are disposed uniformly distributed and are formed as inclined bore holes. Here the passage bore holes 35 run alternately, such as is shown in FIG. 2, from a larger part circle diameter of a first side to a smaller part circle diameter of the second side and the neighboring passage bore holes 35 oppositely from a smaller part circle diameter of the first side to a larger part circle diameter of the second side. An inner row and an outer row of openings of the passage bore holes 35 thereby result at the two sides of the middle piece 20, wherein the passage bore holes 35 in each case are combined by an inner ring groove 36 and by an outer ring groove 37 on the first side and by an inner ring groove 38 and by an outer ring groove 39 on the second side. In each case there result an inner web face 40, a middle web face 41, and an outer wet face 42 by the two neighboring ring groove 36, 37 or, respectively 38, 39 on each side.

One or several sealing disks 23 are disposed in the mounted state between the first cover piece 18 and the middle piece 20 as well as between the second cover piece 19 and the middle piece 20 in such way that the inner disposed region of the sealing disks 23 is solidly clamped between the inner web face 28 of the first cover piece 18 and the inner web face 40 of the middle piece 20 and wherein the outer region of the sealing disk 23 comes to rest on the middle web face 41 of the middle piece 20. The spacer disks 24 have the same or a lesser strength as compared to the sealing disks 23 and are clamped between the outer web faces 29 of the first cover piece 18 and the outer web faces 42 of the middle piece 20.

The sealing disks 23 between the second cover piece 19 and the middle piece 20 are clamped between the two oppositely disposed web faces 33 and 40 in the same way and are brought to rest on the middle web face 41 of the middle piece 20. A selected pretension can be applied to the sealing disks 23, wherein the oppositely disposed inner web faces 28, 33 of the two cover pieces 18, 19 obtained a longer radial distance from the middle axis as compared to the way of providing the inner web faces 40 at the two sides of the middle piece 20. A selected pretension at the sealing disks 23 can also be generated by having the spacer disks 24 a smaller thickness as compared to the sealing disks 23.

It is also possible to obtain a pretension of the sealing disks 23, where usual spring disks are employed instead of the sealing disks 23. Then an unequal radial distance to the middle axis of the web faces 28, 33 and 40 and/or a smaller thickness of the spacer disks 24 can be dispensed with.

Compressed air subjected to pressure in the pressure space 11 for example flows through all passage bore holes 30 into the ring groove 31 of the second cover piece 19 based on the motion of the piston. Here the compressed air loads the sealing disks 23 and closes the inner ring groove 38 of the front side of the middle piece 20. Therewith the connection to each second passage bore hole 35 is interrupted. The compressed air flows however through the outer ring groove 39 to each other second passage bore hole 35 and passes into the inner ring groove 36 of the rearside of the middle piece 20 and charges the sealing disk 23 for such time until a required pressure has set in for lifting off the sealing disks 23. Here only the outer edge of the sealing disks 23 lifts off from the middle web face 41 of the middle piece 20 and becomes to rest at the conical stop face 27 of the first cover piece 18. The compressed air flows through the passage bore holes 25 or, respectively, 15 of the first cover piece 18 or, respectively, of the piston 5 into the pressure space 10 through the open sealing disks 23.

The compressed air flows in the same way in reverse direction of motion of the piston 5 however through the other passage bore holes 35 in the middle piece 20 from the pressure space 10 into the pressure space 11. Thus the compressed air stream retains closed the sealing disks 23 disposed next in flow direction in each second passage bore hole 35 of the middle piece 20 and opens and passes through the remotely disposed sealing disks 23.

A second embodiment of the flow-through throttle 13 comprises a piston 5' according to FIG. 4, wherein the piston 5' is clamped in axial direction on the piston rod 6' between a pretension piston clamping ring 43 and a fixedly disposed piston clamping ring 44, and wherein the piston 5' separates the two pressure spaces 10', 11' in a conventional way from each other. The two piston clamping rings 43, 44 have conical stop faces 45 and 46 formed in a special way on the front faces disposed toward each other for the ring disks 23, as well as in each case a web face 47 and 48 following in the direction of the axis of the piston rod 6'. The piston 5' has in each case a ring groove 49 on the one hand and a ring groove 50 on the other hand at the two front faces. Here in each case one of the ring grooves 49, 50 is connected to the oppositely disposed pressure space 10', 11' through several inclined running passage bore holes 51 and are under bypassing of the oppositely disposed ring groove 49, 50. All passage bore holes 51 are disposed on the same part circle and are arranged uniformly distributed on this part circle.

The two ring grooves 49, 50 are covered sealingly by the sealing disks 23, wherein the sealing disks 23 in each case are tensed in the region close to the axis by the web faces 47 and 48 of the two piston clamping rings 43 and 44 and by oppositely disposed web faces 52 and 53 at the piston 5' and wherein the web faces 47 and 48 come to rest in the region remote to the axis body in each case are web face 54 and 55 of the piston 5'.

Again the sealing disks 23 can be employed individually or in packets. A pretension subjecting the sealing disks 23 can be generated by a corresponding selection of the radial distances of the web faces 47, 48 clamping the sealing disks 23' at the piston clamping rings 43, 44 and at the web faces 52 and 53 at the piston 5' and in connection with the furnished clamping force between the two piston clamping rings 43, 44.

The second embodiment is equipped in each case with the packets of at least two sealing disks 23 according to FIG. 5. The sealing disks 23 here comprise a magnetizable material. In addition each packet of sealing disks 23 is coordinated to an electromagnet 56 and 57, wherein the electromagnet 56 and 57 in each case encloses the piston 5' and each record of sealing disks 23 separately in an externally controllable magnet flux move. The magnet flux here changes the tensions of the packets of sealing disks 23 and influences thereby the opening characteristics all the sealing disks 23 in a tuned way relative to a concrete application case.

List of Reference Numerals 1 casing
2 casing wall
3 casing foot
4 casing cover
5,5' piston
6,6' piston rod
7 piston rod head
8 bellows
9 piston ring
10, 10' first pressure space
11, 11' second pressure space
12 compressed air supply
13 overflow throttle
14 hollow space
15 flow-through bore hole
16 throttle insert
17 sealing elements
18 first cover piece
19 second cover piece
20 middle piece
21 screw
22 sealing element
23 sealing disks
24 spacer disk
25 passage bore hole
26 ring groove
27 conical stop face
28 inner web face
29 outer web face
30 passage bore hole
31 ring groove
32 conical stop face
33 inner web face
34 outer web face
35 passage bore hole
36 inner ring groove
37 outer ring groove
38 inner ring groove
39 outer ring groove
40 inner web face
41 middle web face
42 outer web face
43 pretensioned piston clamping ring
44 fixed piston clamping ring
45 conical stop face
46 conical stop face
47 web face
48 web face
49 ring groove
50 ring groove
51 passage bore hole
52 web face
53 web face
54 web face
55 web face
56 electromagnet
57 electromagnet

What is claimed is:

1. A spring and damper unit for a motor vehicle comprising a cylindrical casing (1) forming a cylinder chamber and filled with compressed air;

a double acting piston (5,5') having a one-sided piston rod (6,6'), wherein the cylindrical casing (1) and the piston rod (6,6') are adapted for being clamped between a body part and a wheel of the motor vehicle and wherein the double acting piston (5,5') divides the cylinder chamber of the casing (1) into two pressure chambers (10, 10', 11, 11');

a first overflow throttle (13) connecting the two pressure chambers (10, 10', 11, 11') to each other in the double acting piston (5,5) for the purpose of volume balancing wherein the first overflow throttle (13) includes a first passage and a first springing sealing disk (23) for opening or closing the first passage;

a second overflow throttle (13) connecting the two pressure chambers (10, 10', 11, 11') to each other in the double acting piston (5,5) for the purpose of volume balancing, wherein the second overflow throttle (13) includes a second passage and a second springing sealing disk (23) for opening or closing the second passage, wherein the first overflow throttle (13) is disposed oppositely directed relative to the second overflow throttle (13) with respect to a flow passage direction and wherein a blocked first overflow throttle (13) can be bypassed by a free second overflow throttle (13);

a first plurality of passage bore holes (35, 51) are coordinated to the first overflow throttle (13);

a second plurality of passage bore holes (35, 51) are coordinated to the second overflow throttle (13);

wherein first smaller part openings of the first plurality of passage bore holes (35, 51) of a first smaller part circle and first larger part openings of the first plurality of passage bore holes (35, 51) of a first larger part circle of each side are separated from each other by a first ring shaped web face (41, 54), and wherein the first springingly sealing disks (23) with their large diameter region are sealingly resting on the first ring-shaped web face (41,54); and wherein second smaller part openings of the second plurality of passage bore holes (35, 51) of a second smaller part circle and second larger part openings of the second plurality of passage bore holes (35, 51) of a second larger part circle of each side are separated from each other by a second ring shaped web face (41, 54), and wherein the second springingly sealing disks (23) with their large diameter region are sealingly resting on the second ring-shaped web face (41,54).

2. The spring and damper unit according to claim 1 further comprising first cover pieces (18, 19) contacting and tensioning the first springingly sealing disks (23) against the front faces of the piece (5, 5'); and conical stop faces (27, 32, 45, 46) are formed at the first cover pieces (18, 19).

3. The spring and damper unit according to claim 1 wherein the first springingly sealing disks (23) and the second springingly sealing disks are pretensioned into their closing position by a different radial distance of the inner web faces (28, 33) of the cover pieces (18, 19) relative to the inner web faces (40) of the middle piece (20) or the axis of the piston (6) and/or by a lower thickness of the spacer disks (24) relative to the thickness of the sealing disks (23).

4. The spring and damper unit according to claim 1 wherein the first springingly sealing disks (23) and the second springingly sealing disks are pretensioned into their closing position by a different radial distance of the inner web faces (28, 33) of the cover pieces (18, 19) relative to the inner web faces (40) of the middle piece (20) or the axis of the piston (6).

5. The spring and damper unit according to claim 1 wherein the first springingly sealing disks (23) and the second springingly sealing disks are pretensioned into their closing position by a lower thickness of the spacer disks (24) relative to the thickness of the sealing disks (23).

6. The spring and damper unit according to claim 1 further comprising a throttle insert (16);
a first cover piece (18);
a second cover piece (19);
a middle piece (20);
a first spacer disk (24) disposed between the first cover piece (18) and the middle piece (20);
a second spacer disk (24) disposed between the middle piece (20) and the second cover piece (19), wherein the first spacer disk (24) and the second spacer disk (24) are jointly tensioned and clamped with the throttle insert (16).

7. The spring and damper unit according to claim 1 further comprising a first cover piece (18);
first passage bore holes (25) disposed in the first cover piece (18);
a first circulating ring groove (26) disposed in the first cover piece (18),
wherein the first passage bore holes (25) disposed in the first cover piece (18) join into the first circulating ring groove (26), a first conical stop face (27) for the first springingly sealing disks (23) and disposed in the first cover piece, wherein the first circulating ring groove (26) is joined toward an axis of the cylindrical casing (1) by the first conical stop face (27).

8. The spring and damper unit according to claim 7 further comprising a second cover piece (19);
second passage bore holes (30) disposed in the second cover piece (19);
a second circulating ring groove (31) disposed in the second cover piece (19),
wherein the second passage bore holes (30) disposed in the second cover piece (19) join into the second circulating ring groove (31),
a second conical stop face (32) for the second springingly sealing disks (23) and disposed in the second cover piece, wherein the second circulating ring groove (31) is joined toward the axis by the second conical stop face (32).

9. A spring and damper unit for a motor vehicle comprising a cylindrical casing (1) forming a cylinder chamber and filled with compressed air;
a double acting piston (5,5') having a one-sided piston rod (6,6'), wherein the cylindrical casing (1) and the piston rod (6,6') are adapted for being clamped between a body part and a wheel of the motor vehicle and wherein the double acting piston (5,5') divides the cylinder chamber of the casing (1) into two pressure chambers (10, 10', 11, 11');
a first overflow throttle (13) connecting the two pressure chambers (10, 10', 11, 11') to each other in the double acting piston (5,5) for the purpose of volume balancing wherein the first overflow throttle (13) includes a first passage and a first springing sealing disk (23) for opening or closing the first passage;
a second overflow throttle (13) connecting the two pressure chambers (10, 10', 11, 11') to each other in the double acting piston (5,5) for the purpose of volume balancing, wherein the second overflow throttle (13) includes a second passage and a second springing sealing disk (23) for opening or closing the second passage,
wherein the first overflow throttle (13) is disposed oppositely directed relative to the second overflow throttle (13) with respect to a flow passage direction and wherein a blocked first overflow throttle (13) can be bypassed by a free second overflow throttle (13);
a first plurality of passage bore holes (35, 51) are coordinated to the first overflow throttle (13), wherein the first plurality of passage bore holes (35, 51) is disposed on a first common part circle in a uniform distribution, wherein the first plurality of passage bore holes (35, 51) of the first overflow throttle (13) is formed as a first plurality of inclined bore holes and are running alternately from a first larger part circle on the one hand to a first smaller part circle on the other hand;
a second plurality of passage bore holes (35, 51) are coordinated to the second overflow throttle (13), wherein the second plurality of passage bore holes (35, 51) is disposed on a second common part circle in a uniform distribution, wherein the second plurality of passage bore holes (35, 51) of the second overflow throttle (13) is formed as a second plurality of inclined bore holes and are running alternately from a second larger part circle on the one hand to a second smaller part circle on the other hand;

wherein first smaller part openings of the first plurality of passage bore holes (35, 51) of the first smaller part circle and first larger part openings of the first plurality of passage bore holes (35, 51) of the first larger part circle of each side are separated from each other by a first ring shaped web face (41, 54), and wherein the first springingly sealing disks (23) with their large diameter region are sealingly resting on the first ring-shaped web face (41,54); and wherein second smaller part openings of the second plurality of passage bore holes (35, 51) of the second smaller part circle and second larger part openings of the second plurality of passage bore holes (35, 51) of the second larger part circle of each side are separated from each other by a second ring shaped web face (41, 54), and wherein the second springingly sealing disks (23) with their large diameter region are sealingly resting on the second ring-shaped web face (41,54).

10. The spring and damper unit according to claim 9 wherein the first passage bore holes (35, 51) of the first overflow throttle (13) join on a first side of the piston (5, 5') into a ring groove (36, 38, 49, 50); and wherein the first over flow throttle (13) and the second overflow throttle (13) are disposed at the same radial distance from the middle axis and wherein the second passage bore holes (35, 51) of the second overflow throttle (13) join on a second side of the piston (5, 5') into a ring groove (36, 38, 49, 50).

11. The spring and damper unit according to claim 9 wherein the first springingly sealing disks (23) of the first overflow throttle (13) are made of a spring material and are fixedly clamped in the region of their smaller diameter;

wherein second springingly sealing disks (23) of the second overflow throttle (13) are made of a spring material and are fixedly clamped in the region of their smaller diameter.

12. The spring and damper unit according to claim 11 further comprising first cover pieces (18, 19) tensioning the first springingly sealing disks (23) against the front faces of the piece (5, 5'); and conical stop faces (27, 32, 45, 46) are formed at the first cover pieces (18, 19).

13. The spring and damper unit according to claim 12 further comprising a first electromagnet (56, 57) coordinated to the first overflow throttle (13);

a second electromagnet (56, 57) coordinated to the second overflow throttle (13).

14. The spring and damper unit according to claim 11 further comprising first cover pieces (18, 19) tensioning the first springingly sealing disks (23) by piston clamping rings (43,44) against the front faces of the piece (5, 5'); and conical stop faces (27, 32, 45, 46) formed at the piston clamping rings (43, 44).

15. The spring and damper unit according to claim 11 wherein the first springingly sealing disks (23) and the second springingly sealing disks are pretensioned into their closing position by a different radial distance of the inner web faces (28, 33) of the cover pieces (18, 19) relative to the inner web faces (40) of the middle piece (20) or the axis of the piston (6) and/or by a lower thickness of the spacer disks (24) relative to the thickness of the sealing disks (23).

16. The spring and damper unit according to claim 11 further comprising a first electromagnet (56, 57) coordinated to the first overflow throttle (13);

a second electromagnet (56, 57) coordinated to the second overflow throttle (13).

17. The spring and damper unit according to claim 11 wherein the first springingly sealing disks (23) and the second springingly sealing disks are pretensioned into their closing position by a different radial distance of the inner web faces (28, 33) of the cover pieces (18, 19) relative to the inner web faces (40) of the middle piece (20) or the axis of the piston (6).

18. Spring and damper unit for motor vehicle comprising a cylindrical casing (1) filled with compressed air and a double acting piston (5,5') with a one-sided piston rod (6,6'), wherein the casing (1) and the piston rod (6,6') are clamped between a body part and a wheel of the motor vehicle and wherein the piston (5,5') divides the cylinder space of the casing (1) into two pressure spaces (10, 10', 11, 11') and wherein the two pressure spaces (10, 10', 11, 11') are connected to each other through a first overflow throttle (13) and through a second overflow throttle (13) in the piston (5,5') for the purpose of volume balancing wherein each said overflow throttle (13) comprises a passage and a plurality of springing sealing disks (23) for opening or closing the passage, wherein one of the plurality of springing sealing disks (23) is disposed oppositely directed relative to another one of the plurality of springing sealing disks (23) in their flow passage direction and wherein a blocked one of the overflow throttles (13) can be bypassed by a free remaining one of the overflow throttles (13), wherein several passage bore holes (35, 51) are coordinated to each overflow throttle (13), wherein the passage bore holes (35, 51) are disposed on a common part circle in uniform distribution, the passage bore holes (35, 51) of the two overflow throttles (13) are formed as inclined bore holes and are running alternately from a larger part circle on the one hand to a smaller part circle on the other hand, the openings of the passage bore holes (35, 51) of the smaller part circle and the openings of the passage bore holes (35, 51) of the larger part circle of each side are separated from each other by a ring shaped web face (41, 54), and the sealing disks (23) having a large diameter region are sealingly resting on the web faces (41,54).

19. Spring and damper unit according to claim 10 characterized in that the sealing disks (23) of each overflow throttle (13) are made of a spring material and are fixedly clamped in the region of their smaller diameter.

20. Spring and damper unit according to claim 19, characterized in that an electromagnet (56, 57) is coordinated to each overflow throttle (13).

21. Spring and damper unit according to claim 19 characterized in that the sealing disks (23) are tensioned by cover pieces (18, 19) or by piston clamping rings (43,44) against the front faces of the piece (5, 5') and that conical stop faces (27, 32, 45, 46) are formed at the cover pieces (18, 19) or at the piston clamping rings (43, 44).

22. Spring and damper unit according to claim 18 characterized in that the two over flow throttles (13) are disposed at the same radial distance from the middle axis and the passage bore holes (35, 51) of the overflow throttles (13) join on each side of the piston (5, 5') into a ring groove (36, 38, 49, 50).

23. The spring and damper unit according to claim 18 further comprising one or several spacer disks (24) disposed between a first cover piece (18) and a middle piece (20) as well as between the middle piece (20) and a second cover piece (19) together with the sealing disks (23) and are jointly tensioned and clamped with a throttle insert (16), wherein the spacer disks (24) have the same or a lesser strength and a larger diameter as compared to the sealing disks (23) and wherein the spacer disks (24) are clamped between outer web faces (29) of the first cover piece (18) and outer web faces (42) of the middle piece (20) as well as between outer web faces (34) of the second cover piece (19) and the outer web faces (42) of the middle piece (20).

24. The spring and damper unit according to claim 23 wherein the spacer disks (24) are concentric cylindrical disks disposed on the same level in axial direction as the sealing disks (23), and wherein an outer diameter of the spacer disks (24) is substantially the same as an outer diameter of the first cover piece (18), of the second cover piece (19) and of the middle piece (20), and wherein an inner diameter of the spacer disks (24) is larger than an outer diameter of the sealing disks (23).

25. Spring and damper unit for motor vehicle comprising a cylindrical casing (1) filled with compressed air and a double acting piston (5,5') with a one-sided piston rod (6,6'), wherein the casing (1) and the piston rod (6,6') are clamped between a body part and a wheel of the motor vehicle and wherein the piston (5,5') divides the cylinder space of the casing (1) into two pressure spaces (10, 10', 11, 11') and wherein the two pressure spaces (10, 10', 11, 11') are connected to each other through a first overflow throttle (13) and through a second overflow throttle (13) in the piston (5,5') for the purpose of volume balancing wherein each said overflow throttle (13) comprises a passage and a plurality of springing sealing disks (23) for opening or closing the passage, wherein one of the plurality of springing sealing disks (23) is disposed oppositely directed relative to another one of the plurality of springing sealing disks (23) in their flow passage direction and wherein a blocked one of the overflow throttles (13) can be bypassed by a free remaining one of the overflow throttles (13), wherein several passage bore holes (35, 51) are coordinated to each overflow throttle (13), wherein the passage bore holes (35, 51) are disposed on a common part circle in uniform distribution, the passage bore holes (35, 51) of the two overflow throttles (13) are formed as inclined bore holes and are running alternately from a larger part circle on the one hand to a smaller part circle on the other hand, the openings of the passage bore holes (35, 51) of the smaller part circle and the openings of the passage bore holes (35, 51) of the larger part circle of each side are separated from each other by a ring shaped web face (41, 54), and the sealing disks (23) having a large diameter region are sealingly resting on the web faces (41, 54), wherein the sealing disks (23) are pretensioned into their closing position, by a different radial distance of the inner web faces (28, 33) of the cover pieces (18, 19) relative to the inner web faces (40) of the middle piece (20) or the axis of the piston (6) and/or by a lower thickness of the spacer disks (24) relative to the thickness of the sealing disks (23).

26. A spring and damper unit for a motor vehicle comprising a cylindrical casing (1) forming a cylinder chamber and filled with compressed air;

a double acting piston (5,5') having a one-sided piston rod (6,6'), wherein the cylindrical casing (1) and the piston rod (6,6') are adapted for being clamped between a body part and a wheel of the motor vehicle and wherein the double acting piston (5,5') divides the cylinder chamber of the casing (1) into two pressure chambers (10, 10', 11, 11');

a first overflow throttle (13) connecting the two pressure chambers (10, 10', 11, 11') to each other in the double acting piston (5,5) for the purpose of volume balancing wherein the first overflow throttle (13) includes a first passage and a first springing sealing disk (23) for opening or closing the first passage;

a second overflow throttle (13) connecting the two pressure chambers (10, 10', 11, 11') to each other in the double acting piston (5,5) for the purpose of volume balancing, wherein the second overflow throttle (13) includes a second passage and a second springing sealing disk (23) for opening or closing the second passage, wherein the first overflow throttle (13) is disposed oppositely directed relative to the second overflow throttle (13) with respect to a flow passage direction and wherein a blocked first overflow throttle (13) can be bypassed by a free second overflow throttle (13);

a first plurality of passage bore holes (35, 51) are coordinated to the first overflow throttle (13), wherein the first plurality of passage bore holes (35, 51) is disposed on a first common part circle in a uniform distribution, wherein the first plurality of passage bore holes (35, 51) of the first overflow throttle (13) is formed as a first plurality of inclined bore holes and are running alternately from a first larger part circle on the one hand to a first smaller part circle on the other hand;

a second plurality of passage bore holes (35, 51) are coordinated to the second overflow throttle (13), wherein the second plurality of passage bore holes (35, 51) is disposed on a second common part circle in a uniform distribution, wherein the second plurality of passage bore holes (35, 51) of the second overflow throttle (13) is formed as a second plurality of inclined bore holes and are running alternately from a second larger part circle on the one hand to a second smaller part circle on the other hand;

wherein first smaller part openings of the first plurality of passage bore holes (35, 51) of the first smaller part circle and first larger part openings of the first plurality of passage bore holes (35, 51) of the first larger part circle of each side are separated from each other be a first ring shaped web face (41, 54), and wherein the first springingly sealing disks (23) with their large diameter region are sealingly resting on the first ring-shaped web face (41,54); and wherein second smaller part openings of the second plurality of passage bore holes (35, 51) of the second smaller part circle and second larger part openings of the second plurality of passage bore holes (35, 51) of the second larger part circle of each side are separated from each other by a second ring shaped web face (41, 54), and wherein the second springingly sealing disks

(23) with their large diameter region are sealingly resting on the second ring-shaped web face (41,54), wherein the first springingly sealing disks (23) of the first overflow throttle (13) are made of a spring material and are fixedly clamped in the region of their smaller diameter;

wherein second springingly sealing disks (23) of the second overflow throttle (13) are made of a spring material and are fixedly clamped in the region of their smaller diameter, wherein the first springingly sealing disks (23) and the second springingly sealing disks are pretensioned into their closing position by a lower thickness of the spacer disks (24) relative to the thickness of the sealing disks (23).

27. The spring and damper unit for a motor vehicle comprising a cylindrical casing (1) forming a cylinder chamber and filled with compressed air;

a double acting piston (5,5') having a one-sided piston rod (6,6'), wherein the cylindrical casing (1) and the piston rod (6,6') are adapted for being clamped between a body part and a wheel of the motor vehicle and wherein the double acting piston (5,5') divides the cylinder chamber of the casing (1) into two pressure chambers (10, 10', 11, 11');

a first overflow throttle (13) connecting the two pressure chambers (10, 10', 11, 11') to each other in the double acting piston (5,5) for the purpose of volume balancing wherein the first overflow throttle (13) includes a first passage and a first springing sealing disk (23) for opening or closing the first passage;

a second overflow throttle (13) connecting the two pressure chambers (10, 10', 11, 11') to each other in the double acting piston (5,5) for the purpose of volume balancing, wherein the second overflow throttle (13) includes a second passage and a second springing sealing disk (23) for opening or closing the second passage, wherein the first overflow throttle (13) is disposed oppositely directed relative to the second overflow throttle (13) with respect to a flow passage direction and wherein a blocked first overflow throttle (13) can be bypassed by a free second overflow throttle (13);

a first plurality of passage bore holes (35, 51) are coordinated to the first overflow throttle (13), wherein the first plurality of passage bore holes (35, 51) is disposed on a first common part circle in a uniform distribution, wherein the first plurality of passage bore holes (35, 51) of the first overflow throttle (13) is formed as a first plurality of inclined bore holes and are running alternately from a first larger part circle on the one hand to a first smaller part circle on the other hand;

a second plurality of passage bore holes (35, 51) are coordinated to the second overflow throttle (13), wherein the second plurality of passage bore holes (35, 51) is disposed on a second common part circle in a uniform distribution, wherein the second plurality of passage bore holes (35, 51) of the second overflow throttle (13) is formed as a second plurality of inclined bore holes and are running alternately from a second larger part circle on the one hand to a second smaller part circle on the other hand;

wherein first smaller part openings of the first plurality of passage bore holes (35, 51) of the first smaller part circle and first larger part openings of the first plurality of passage bore holes (35, 51) of the first larger part circle of each side are separated from each other by a first ring shaped web face (41, 54), and wherein the first springingly sealing disks (23) with their large diameter region are sealingly resting on the first ring-shaped web face (41,54); and wherein second smaller part openings of the second plurality of passage bore holes (35, 51) of the second smaller part circle and second larger part openings of the second plurality of passage bore holes (35, 51) of the second larger part circle of each side are separated from each other by a second ring shaped web face (41, 54), and wherein the second springingly sealing disks (23) with their large diameter region are sealingly resting on the second ring-shaped web face (41,54);

a throttle insert (16);

a first cover piece (18);

a second cover piece (19);

a middle piece (20);

a first spacer disk (24) disposed between the first cover piece (18) and the middle piece (20);

a second spacer disk (24) disposed between the middle piece (20) and the second cover piece (19), wherein the first spacer disk (24) and the second spacer disk (24) are jointly tensioned and clamped with the throttle insert (16).

28. The spring and damper unit according to claim 27 wherein the first spacer disk (24) and the second spacer disk (24) have a same or a lesser strength and a larger diameter as compared to the first springing sealing disk (23) and the second springing sealing disk (23) and wherein the first spacer disk (24) is clamped between outer web faces (29) of the first cover piece (18) and first outer web faces (42) of the middle piece (20) and wherein the second spacer disk (24) is clamped between outer web faces (34) of the second cover piece (19) and second outer web faces (42) of the middle piece (20).

* * * * *